United States Patent [19]

Nakamura et al.

[11] 4,325,222
[45] Apr. 20, 1982

[54] DEVICE RESPONSIVE TO UNUSUAL TEMPERATURE CHANGE IN REFRIGERANT COMPRESSOR

[75] Inventors: Teruo Nakamura, Konan; Masami Otani, Higashimatsuyama, both of Japan

[73] Assignees: Nissan Motor Company, Limited, Yokohama; Diesel Kiki Company, Limited, Tokyo, both of Japan

[21] Appl. No.: 103,580

[22] Filed: Dec. 14, 1979

[30] Foreign Application Priority Data

Jan. 10, 1979 [JP] Japan ............................ 54-1651[U]

[51] Int. Cl.[3] .................. F25B 27/00; G05B 5/00; H02H 5/04
[52] U.S. Cl. ................................. 62/126; 62/323.4; 318/473; 361/104
[58] Field of Search ............... 62/323 C, 228 R, 126; 361/104; 219/517; 318/471, 473

[56] References Cited

U.S. PATENT DOCUMENTS 3,660,720  5/1972  Samm et al. ............... 361/104 X
3,702,064  11/1972 Ciolli ............................ 62/228 R
3,765,191  10/1973 Canter ........................... 62/228 R
4,075,678  2/1978  Levinn ............................ 361/104

Primary Examiner—William E. Wayner

[57] ABSTRACT

A device responsive to an unusual temperature change in a refrigerant compressor using an electromagnetic clutch including a magnet coil as an actuating element of the clutch, comprising an overcurrent-responsive element such as a fuse connected in parallel with the magnet coil, a temperature-responsive switch operative to be open when the temperature in the compressor rises beyond a predetermined value, and a switching element such as a transistor which is non-conductive when the temperature-responsive switch is closed and which is made conductive to cause the fuse to melt when the temperature-responsive switch is made to open.

10 Claims, 3 Drawing Figures

DEVICE RESPONSIVE TO UNUSUAL TEMPERATURE CHANGE IN REFRIGERANT COMPRESSOR

FIELD OF THE INVENTION

The present invention relates to a refrigerant compressor forming part of a refrigeration system of an air conditioner and, particularly, to a device responsive to an unusual change of temperature in a refrigerant compressor of a refrigeration system of an air conditioner. More particularly, the present invention relates to a device responsive to an unusual rise of temperature in a refrigerant compressor of the type including an electric actuating element such as a magnet coil of an electromagnetic clutch incorporated in a certain type of refrigerant compressor.

BACKGROUND OF THE INVENTION

When an insufficient amount of refrigerant is circulated through the refrigerant compressor of the refrigeration system of an air conditioner due to, for example, leakage of the refrigerant from the system, not only the refrigeration system will be starved but, the refrigerant temperature in the cooling cycle with respect to a thermal load rises, and in particular a refrigerant suction and discharged fluid temperature will rise. The insufficient lubrication results from leakage of the lubricant contained in the refrigerant being allowed to leak from the refrigeration system.

The present invention contemplates provision of a device adapted to stop the refrigerant compressor or produce a warning signal in the event the temperature in the refrigerant compressor raises beyond a predetermined critical value due to the lack of refrigerant passed through the compressor.

SUMMARY OF THE INVENTION

In accordance with the present invention, there is provided a device responsive to an unusual temperature change in a refrigerant compressor including an electric actuating element such as a magnet coil of an electromagnetic clutch, comprising, in combination, an overcurrent-responsive element such as a fuse connected in series with the aforesaid actuating element, a temperature-responsive switch electrically connected in parallel with the series combination of the actuating element of the refrigerant compressor and the above mentioned overcurrent-responsive element, the temperature-responsive switch projecting into the refrigerant compressor chamber so as to be responsive to a change of discharge refrigerant fluid temperature across a predetermined value in the refrigerant compressor, and a switching element such as a transistor connected in parallel with the actuating element of the refrigerant compressor and in series with the aforesaid overcurrent-responsive element and operable between electrically conductive and non-conductive states when the temperature-responsive switch is open and closed.

BRIEF DESCRIPTION OF THE DRAWING

The features and advantages of the device according to the present invention will be more clearly appreciated from the following description taken in conjunction with the accompanying drawing, in which.

DESCRIPTION OF THE PREFERRED EMBODIMENT

Figure 1:
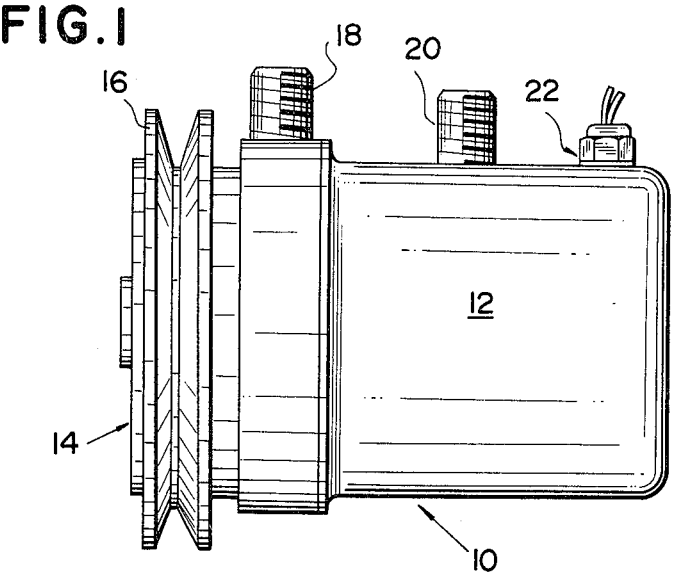
FIG. 1 is a side elevation view showing a refrigerant compressor exemplifying a refrigerant compressor for which the device according to the present invention is to operate.

Referring to FIG. 1 of the drawing, a refrigeration system of an air conditioner comprises a refrigerant compressor 10 which forms part of a closed-loop circuit for a refrigerant fluid of, for example, Freon (R.T.M.). Thus, the refrigerant compressor 10 is operatively interposed, though not shown, between an evaporator unit which is adapted to convert the refrigerant fluid from a liquid state into a gaseous state and a condenser unit which is adapted to convert the refrigerant fluid from a gaseous state into a liquid state, as is well known in the art. The refrigerant compressor 10 per se is adapted to convert the low-temperature, low-pressure refrigerant gas from the evaporator unit into a high-temperature, high-pressure refrigerant gas and to deliver it to the condenser unit.

The refrigerant compressor 10 herein shown in assumed, by way of example, to form part of an air cooling system for an automotive vehicle and, thus, has a casing structure 12 having formed therein a compression chamber having suction and discharge ends. In this compression chamber is rotably mounted, a rotary piston not shown which is driven by the engine through an electromagnetic clutch 14 which is placed, in effect, between the piston and a drive pulley 16 connected to the engine output shaft through an endless belt (not shown).

When the magnet coil of the electromagnetic clutch remains deenergized, the drive pulley 16 rotates freely on bearings arranged around an extension of the compressor shaft so that the compressor shaft and accordingly the swash plate on the shaft are maintained inoperative. When the magnet coil of the clutch is energized, then the electromagnetic clutch is coupled and transmits a driving torque from the pulley 16 to the compressor shaft, causing the swash plate to rotate with the compressor shaft about the center axis of the shaft. The rotation of the swash plate forces the double-acting pistons to endwise move along the compressor shaft and produces alternate contraction of the compressor chambers on both sides of each piston.

The compressor chambers of the individual cylinders have valved inlet ports which jointly communicate with the evaporator unit of the refrigeration system through a refrigerant inlet fitting 18 and valved outlet ports which jointly communicate with the condenser unit of the refrigeration system through a refrigerant outlet fitting 20.

While the refrigerant compressor 10 illustrated in FIG. 1 has thus been assumed to be of the rotary type, the improvement proposed by the present invention may be incorporated into any type of refrigerant compressor insofar as the compressor has at least one variable-volume compressor chamber in which a refrigerant is to be compressed.

In accordance with the present invention, the refrigerant compressor 10 of the type above exemplified is provided with a thermostatic switch 22 which is responsive to a change in the temperature of the discharged refrigerant gas in the compressor chambers or, more particularly, one of the compressor chambers of the compressor 10.

Figure 2:
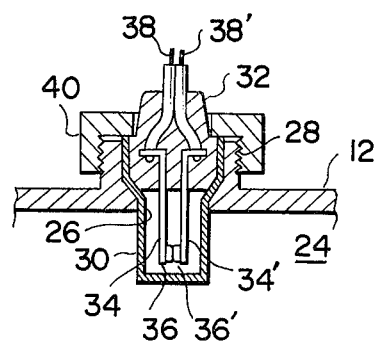
FIG. 2 is a sectional view showing the detailed construction of a thermostatic switch forming part of a device embodying the present invention.

As illustrated in FIG. 2, the thermostatic switch 22 projects into a compressor chamber 24 through an opening 26 formed in a wall portion of the casing structure 12 defining the compressor chamber 24, in order to directly sense the discharged refrigerant gas in the compressor chamber 24. The casing structure 12 has an externally threaded annular projection 28 having the opening 26 formed therein and has a generally cup-shaped sleeve 30 closely fitted to the inner peripheral surface of the annular projection 28. The sleeve 30 is formed of a material having a relatively high thermal conductivity and axially projects into the compressor chamber 24 through the opening 26 in the casing structure 12 with its open end located adjacent the outer axial end of the annular projection 28 as shown.

A plug member 32 of an electrically non-conductive material is closely received in an axially outer portion of the sleeve 30 and has a pair of bimetallic elements 34 and 34' each partly embedded in the plug member 32. The two bimetallic elements 34 and 34' axially project substantially in parallel with each other into the space in an axially inner portion of the sleeve 30 and have electric contact elements 36 and 36', respectively, carried at their respective leading ends. The bimetallic elements 34 and 34' and the contact elements 36 and 36' are arranged so that the contact elements 36 and 36' remain in contact with each other in response to temperatures lower than a predetermined value and are spaced apart from each other when the bimetallic elements 34 and 34' are subjected to temperatures higher than the predetermined value. The bimetallic elements 34 and 34' are connected to lead wires 38 and 38', respectively, extending out of the plug member 32. The plug member 32 is held is position by means of a retaining member 40 having an internally threaded annular projection engaging the externally threaded annular projection 28 of the casing structure 12. The retaining member 40 is formed with an opening allowing the plug member 32 to project outwardly therethrough.

The thermostatic switch 22 is thus herein assumed to be of the bimetallic type by way of example but, if desired, may be constituted by any type of temperature-sensitive switch means responsive to a change of discharged refrigerant gas temperature beyond a predetermined value and operative to produce an electric signal in response to a rise of temperature beyond the predetermined value.

Figure 3:
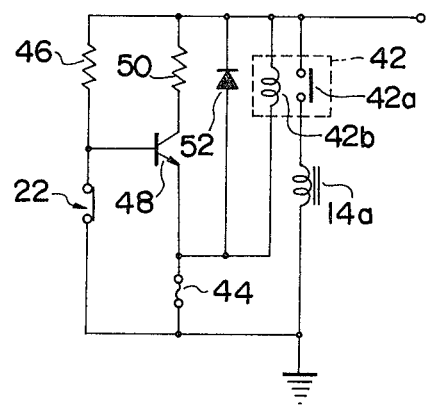
FIG. 3 is a circuit diagram showing an electric circuit constituting a preferred embodiment of the present invention.

The thermostatic switch 22 of the nature above exemplified forms part of an electric circuit constituting a device according to the present invention. As illustrated in FIG. 3, the electric circuit, viz., a device embodying the present invention is constructed and arranged in combination with the magnet coil (indicated at 14a) forming part of the electromagnetic clutch 14 incorporated in the refrigerant compressor 10 shown in FIG. 1 and comprises a relay 42 consisting of normally-open contacts 42a and a relay coil 42b. The normally-open contacts 42a of the relay 42 are connected between a suitable d.c. power source (not shown) and ground through the magnet coil 14a of the electromagnetic clutch 14 (FIG. 1) while the coil 42b of the relay 42 is connected between the d.c. power source and ground through a fuse 44.

The series combination of the relay coil 42b and the fuse 44 is shunted by the above described thermostatic switch 22 which is connected between the d.c. power source and ground through a resistor 46 intervening between the switch 22 and the power source. Between the power source and the fuse 44 is provided a transistor 48 having a collector electrode connected to the power source through a resistor 50 and an emitter electrode grounded through the fuse 44. The base electrode of the transistor 48 is connected to a junction between the thermostatic switch 22 and the resistor 46. The series combination of the transistor 48 and the resistor 50 is shunted by a diode 52 having a cathode terminal connected to the d.c. power source and an anode terminal connected to a junction between the fuse 44 and the emitter electrode of the transistor 48.

When, now, the refrigeration system including the device thus constructed and arranged in conjunction with the refrigerant compressor 10 (FIG. 1) is in operation, the coil 42b of the relay 42 for actuating the electromagnetic clutch 14 (FIG. 1) is kept energized from the d.c. power source so that the normally-open contacts 42a of the relay 42 are held in the closed conditions thereof. When the contacts 42a of the relay 42 are closed, the magnet coil 14a of the electromagnetic clutch 14 is energized and holds the clutch 14 coupled, maintaining the refrigerant compressor 10 operative. If the refrigerant gas circulated through the refrigerant compressor 10 is maintained at a temperature lower than the predetermined value dictated by the thermostatic switch 22, the bimetallic elements 34 and 34' (FIG. 2) of the thermostatic switch 22 are allowed to remain in positions holding the contact elements 36 and 36' in contact with each other. Under these conditions, the current supplied from the d.c. power source is passed to ground partially through the series combination of the relay coil 42b and the fuse 44 and partially through the series combination of the thermostatic switch 22 and the resistor 46. When the thermostatic switch 22 is thus held in a condition forming part of the current path between the power source and ground, the potential at the base electrode of the transistor 48 is maintained at a level close to the ground level so that the transistor 48 remains in a non-conductive state. When the transistor 48 is maintained non-conductive, only the current passed through the relay coil 42b is passed through the fuse 44.

In the event the refrigerant compressor 10 is overheated for some reason and as a consequence the refrigerant gas in the compressor 10 rises beyond the predetermined value, the bimetallic elements 34 and 34' of the thermostatic switch 22 are caused to warp away from each other and cause the contact elements 36 and 36' to be spaced apart from each other. The thermostatic switch 22 being thus made open, the potential at the base electrode of the transistor 48 rises and makes the transistor 48 conductive. Under these conditions, not only the current path constituted by the relay coil 42b but a current path constituted by the series combination of the transistor 48 and the resistor 50 are formed between the d.c. power source and the fuse 44. The fuse 44 is, thus, subjected to the current passed through the transistor 48 and the resistor 50 as well as the current passed through the relay coil 42b and is, as a consequence, caused to melt, interrupting the current path constituted by the relay coil 42b. The relay coil 42b being thus deenergized, the contacts 42a of the relay 42 are caused to open and to denergize the magnet coil 14a of the electromagnetic clutch 14. The electromagnetic clutch 14 is now brought into the uncoupled condition thereof and renders the refrigerant compressor 10 inoperative.

In the embodiment hereinbefore described, the fuse 44 may be replaced with an electric actuating element of a suitable warning device such as a buzzer (not shown), if desired.

While, furthermore, it has been assumed that the thermostatic switch 22 included as a temperature-responsive switch in the described embodiment is of the normally-closed type, the temperature-responsive switch forming part of the device according to the present invention may be of the normally-open type if the electric circuit incorporating such a switch is modified appropriately.

What is claimed is:

1. A refrigerant compressor driving device comprising:
   an electromagnetic clutch for driving the compressor, said clutch being movable between a first position in which it connects the compressor to a driving means to drive the compressor and a second position in which it disconnects the compressor from said driving means;
   an over-heating sensing means inserted into a refrigerant in said compressor to detect over-heating of the refrigerant, said over-heating sensing means being normally in on position and turned off in response to the refrigerant temperature being higher than a predetermined temperature;
   a switch means connected with said over-heating sensing means and being turned on in response to turning off of said over-heating sensing means to produce a high level current; and
   a circuit breaking element responsive to said high level current for breaking the power supply to said clutch for positioning the clutch into said second position.

2. A device as set forth in claim 1, wherein said over-heating sensing means comprises a pair of bimetallic members normally contacting one another and parting from each other responsive to the refrigerant temperature being higher than the predetermined temperature, and a housing receiving said pair of bimetallic members therein and being inserted into said refrigerant in said compressor.

3. A device as set forth in claim 1 or 2, wherein said housing includes a sleeve to be inserted into the refrigerant in the compressor and a plug formed of a non-conductive material and to be engaged with a compressor housing in liquid-tight position.

4. A device as set forth in claim 1 or 2, wherein said over-heating sensing means is inserted into a compressor housing adjacent an outlet port of the compressor housing for detecting the temperature of the refrigerant to be discharged through the outlet port.

5. A refrigerant compressor driving device comprising:
   an electric actuating element for driving said refrigerant compressor;
   a relay interpositioned between an electric power source and said actuating element, said relay assuming a first conductive state when energized and a second non-conductive state when deenergized;
   an overcurrent-responsive element cooperating with said relay for energizing and deenergizing the same;
   a temperature-responsive switch inserted into said refrigerant compressor for detecting the over-heating of a refrigerant fluid when the refrigerant fluid temperature exceeds a predetermined temperature, said temperature-responsive switch being normally in conductive state and turned to non-conductive state in response the over-heating of the refrigerant fluid; and
   a switch element interposed between said overcurrent-responsive element and said electric power source and assuming a conductive state in response to the non-conductive state of said temperature responsive switch to brake said overcurrent-responsive element to deenergize said relay.

6. A device as set forth in claim 5, wherein said temperature-responsive switch is adapted to be closed in response to temperatures lower than said predetermined temperature and to be open in response to temperatures higher than the predetermined temperature.

7. A device as set forth in claim 5 or 6, wherein said overcurrent-responsive element consists of a fuse.

8. A device as set forth in claim 6, wherein said overcurrent-responsive element consists of a fuse and in which said switching element consists of a transistor having a collector electrode connected to a positive D.C. power source, an emittor electrode connected to said fuse, and a base electrode connected between said temperature-responsive switch and said D.C. power source.

9. A device as set forth in claim 8, wherein said temperature-responsive switch comprises a pair of bimetallic elements inserted into a compressor chamber in said refrigerant compressor and two electric contact elements respectively mounted on said bimetallic elements, said bimetallic elements being held in positions having said contact elements in contact with each other in response to temperatures lower than said predetermined temperature and being deformed into positions having said contact elements spaced apart from each other in response to temperatures higher than said predetermined temperature.

10. A device as set forth in claim 5 or 6, wherein said overcurrent-responsive element forms part of an electrically operated warning device.

* * * * *